UNITED STATES PATENT OFFICE.

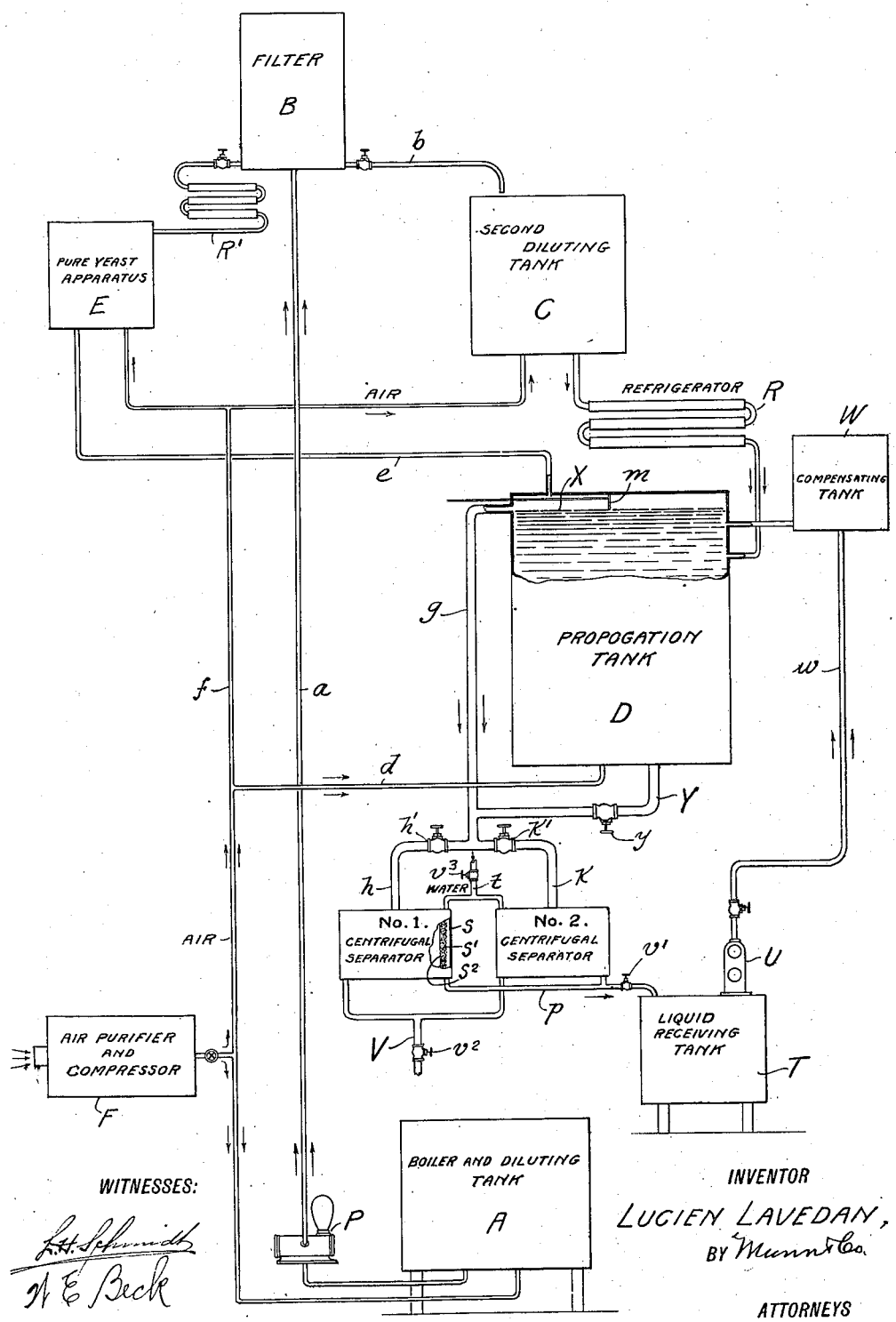

LUCIEN LAVEDAN, OF NEW ORLEANS, LOUISIANA.

PROCESS OF MANUFACTURING YEAST.

1,201,062.  Specification of Letters Patent.  Patented Oct. 10, 1916.

Application filed February 12, 1916. Serial No. 77,896.

*To all whom it may concern:*

Be it known that I, LUCIEN LAVEDAN, a citizen of the United States, and a resident of New Orleans, in the parish of Orleans and State of Louisiana, have invented certain new and useful Improvements in Processes of Manufacturing Yeast, of which the following is a specification.

My invention relates to improvements in processes of manufacturing yeast, and it consists in the various steps hereinafter enumerated.

The object of my invention is to produce yeast in such a manner that the highest possible yield is effected from a given amount of clear sugared liquid, thereby greatly decreasing the cost of manufacture and making use of certain portions of the raw material which have heretofore been wasted.

A further object of my invention is to provide a process for making yeast which is continuous, and in which there is a continuous aeration of the yeast, thereby supplying to the yeast all the air which is necessary to its maximum development and thus tending to a maximum yield of yeast.

A further object of my invention is to provide a process in which the gathering of the yeast is performed by a continuous mechanical operation.

A further object of my invention is to provide a process in which the separation of the yeast from the associated liquid and the drying of the yeast is accomplished in one operation.

A further object of my invention is to provide a process in which said liquid from which the yeast is separated may again be used in the propagation tank.

Other objects and advantages will appear in the following specification and the novel features of the invention will be particularly pointed out in the appended claims.

My invention is illustrated in the accompanying drawings forming part of this application, these drawings being a diagrammatic view of one form of apparatus for carrying out the invention.

The raw material upon which I operate consists of any clear sugared liquid. This may be a properly prepared and diluted molasses or glucose, or a totally saccharified clear grain must such as is now used in the ordinary process of manufacture.

For purposes of illustration, we will assume that the material to be operated on for the production of yeast is molasses. This is run into a boiler and diluting tank A where the molasses is first diluted, two gallons of water to one of molasses being a good proportion. The diluted molasses is then boiled with sulfuric acid. The boiling results in the conversion of the sucrose to glucose, and in the sterilization of the liquid, and the latter is pumped by means of the pump P from the tank A through the pipe $a$ and into the filter B. Here the liquid is filtered and the greater portion passes by means of the pipe $b$ into the second diluting tank C. Here the liquid is again diluted and is passed through the refrigerator R where it is cooled before passing into the propagation tank D.

Owing to the fact, as shown later, that there is a continuous aerating of the liquid during the entire process of fermentation, a temperature of approximately 30° C. is maintained in the propagation tank. In this propagation tank are added the necessary nutritive salts, such as potassium sulfate, ammonium phosphate, etc., in the amounts needed.

During the filling of the propagation tank with the sugared liquid the latter is run into the tank to approximately one-fifth of the capacity of the tank and then a portion of the pure yeast is run in from the pure yeast apparatus E by means of the pipe $e$. The sugared liquid continues to run in until say approximately half of the tank is filled and then another portion of the pure yeast is run in from the tank E and the final portion of the yeast is sent in to fill the tank up to the level X. While this is being carried on, and in fact throughout the entire process, pure air is passed into the bottom of the propagation tank through the pipe $d$ which connects with a pipe $f$ leading to the air purifier and compressor F. This same pipe $f$ enters the boiler A and during the boiling and diluting of the molasses air is passed in, thus tending to hasten the operation through the agitation effected by the passage of the air. The pipe $f$ also communicates with the bottoms of the tanks C and E and the air tends to agitate the liquids in these tanks besides aerating them.

Right here I wish to call attention to the fact that in continuously aerating the liquid in the tank D, I provide the necessary amount of oxygen for the maximum propagation of the yeast because the latter if denied the oxygen from the purified air would get it from the sugar, thereby forming alcohol. The continuous aeration of the liquid in the propagation tank I regard as one of the main features of the invention, because it is due to the fact that the oxygen is supplied to the yeast in sufficient quantity from the air and not from the sugar that I am able to manufacture a much larger amount of yeast from a given quantity of raw material than can possibly be manufactured by other processes in which such continuous aeration is not practised and in which the sugar is largely converted to alcohol in the propagation of the yeast. Now the alcohol produced of course can be utilized, but it is of much lower value than the yeast and consequently the difference in values is a direct loss to the yeast manufacturer. Besides supplying all the air necessary to the yeast cells, the air also serves as a temperature controlling agency and permits the work to be carried on with settings of 8 to 10 Baumé. As fast as the yeast is formed it comes to the surface of the liquid in the tank D in the form of a scum or blanket and here it is continuously skimmed off by mechanical means. This mechanical means is indicated at $m$ in the drawing, but it will be understood that the illustration is purely diagrammatic, the mechanical device for carrying out this process being the subject of a separate application.

The scum or froth which is skimmed from the tank D passes downwardly through the pipe $g$ to either of the centrifugal separators 1 or 2, depending upon which of these separators is in operation. The valves $h'$ and $k'$ in the pipes $h$ and $k$, respectively, control the flow of the froth or scum containing the yeast when either of these valves is open and the other is closed, and the scum or froth will flow into the centrifugal separator past the open valve.

The purpose of having two separators is to permit the continuous operation of the apparatus as a whole while removing the yeast from one of the separators. These centrifugal separators are of large size and can be run at a slow speed as well as at a high one. They are provided with an exterior shell or casing such as that shown at $s$ and an interior rotary part $s'$ having perforated sides against which is disposed a felt lining $s^2$. The space between the inner and outer portions communicates with a discharge pipe $p$ which leads into a liquid receiving tank T. A cold water pipe $t$ has branches which enter the centrifugals so as to wash the yeast on the interior walls of the felt lining. The liquid is thrown with the yeast against the felt lining, the liquid passing through the lining and also through the perforated wall $s'$ and is delivered by the pipe $p$ into the liquid receiving tank. The yeast is retained by the felt lining. When a certain amount of the liquid has been separated from the yeast then the valve $v'$ is closed and the valve $v^2$ is open. Cold water is now turned in by the opening of the valve $v^3$ in the pipe $t$ and flushes the yeast which is held to the felt lining. This water passes on through the perforated sides of the centrifugal separators and out through the pipe V as waste water. The liquid in the receiving tank T is pumped by means of a pump U through the pipe $u$ and into the compensating tank W. This tank is provided with an automatic regulator (not shown) for maintaining a constant level of liquid in the propagation tank.

After the yeast in the centrifugal separator has been washed the separator is further rotated to dry the yeast. The drying is further attained by adding to the yeast about 10% of its weight of fine starch or potato fecula, so that the yeast will be in good condition to be discharged from the separator and also that it may be easily handled when it is subsequently compressed and made into compressed yeast cakes. During the removal of the yeast from one separator, as stated, the other separator is brought into operation. It will be noted that the rotation of the separators tends to aerate the yeast. Thus it will be observed that all along through the entire process I supply the yeast with air. This, as stated above, tends to a larger production of yeast than could possibly be obtained where the process does not afford facilities for supplying the amount of air necessary for the maximum propagation.

When all the yeast that can be procured by gathering the scum has been recovered the valve $y$ in the pipe Y at the bottom of the propagation tank is opened, thereby passing the liquid of the propagation tank through the centrifugal separator so that any yeast which is in the liquid and which did not rise to the surface in the form of scum is centrifugated out and is recovered in the separators. Here again the process differs from the ordinary process in which yeast in suspension in the liquid of the fermentation tanks is lost for the yeast manufacture.

The foregoing description of the process will enable one to readily see the advantages to be derived. The highest results obtained by ordinary processes in which the scum is removed from the propagating tank by hand are 24 kilograms of compressed yeast and 24 liters of alcohol (calculated at 100%) per hundred kilograms of grain.

By the process which forms the subject of the present invention by a pure yeast culture of a suitable liquid with the maximum of sugar the product of "dry yeast" will be 20% of the total weight of the sugar or 100% of the total weight of the sugar when made into compressed yeast, that is to say, 100 pounds C. P. sugar, can produce at least its weight in compressed yeast.

By my process it is true very little alcohol is produced for the reasons stated, but the purpose of the invention is to increase the yield of yeast at the expense of alcohol, since the yeast is the more valuable of the two.

There is another difference between the present process and that which has heretofore been used. The empirical preparation of heavy musts consists in making a sufficiently mucilaginous and viscous must of such a nature that the carbonic acid gas cannot easily separate itself from the globule of yeast, and carries it along to the surface of the must where it is gathered by skimming it by hand with a scoop. The yeast cells which do not rise to the surface, those that remain in suspension in the must, or those that sink to the bottom of the tank are lost in the manufacture of the yeast. Besides this the method of skimming by hand while the must is in full fermentation, takes away from the must a large amount of liquid containing unfermented sugars, which are lost when the yeast is washed. On the other hand, by the present process all of the sugar is utilized for yeast by passing the separated liquid from the centrifugals back into the propagation tank and in subsequently passing the contents of the propagation tank through the centrifugals.

It will thus be seen that I have provided a process in which a number of advantages are attained. A process of continuous aeration of the yeast during the entire period of yeast production; a process in which the operation is continuous; a process in which the aeration takes place in the separator; a process in which the separating and drying constitute virtually one operation, and finally, a process in which the spent liquid is returned to the propagating tank for propagating the undeveloped values.

I have spoken of the return of the liquid separated from the yeast cells, into the compensating tank W from whence it subsequently passes into the propagation tank. This liquid, as has been explained, has certain undeveloped values. I may add to the liquid enough sugared solution so as to bring the density of the main body of the yeast propagating liquid in the propagation tank D to its original density, thus utilizing to the fullest extent the liquid thrown off by the centrifugals.

I claim:—

1. The herein described steps in a process of making yeast, which consists in setting a sugared liquid for yeast propagation while continuously aerating the liquid, continuously skimming off the froth or scum containing the yeast at the top of the liquid, and continuously separating the yeast cells from the liquid portion containing the non-spent sugar, and returning the latter to the main body of the sugared liquid.

2. The herein described steps in a process of making yeast, which consists in setting a sugared liquid for yeast propagation while continuously aerating the liquid, continuously skimming off the froth or scum containing the yeast at the top of the liquid, and continuously separating the yeast cells from the liquid portion containing the non-spent sugar, by centrifugation in the presence of pure air and returning the latter to the main body of the sugared liquid.

3. The herein described process of making yeast, which consists in setting a sugared liquid for yeast propagation while continuously aerating the liquid, continuously skimming off the froth or scum containing the yeast at the top of the liquid, continuously separating the yeast cells from the liquid portion while simultaneously aerating the yeast cells and said liquid portion during said separation and returning said separated liquid portions to the main yeast propagating body.

4. The herein described steps in a process of making yeast, which consists in setting a sugared liquid for yeast propagation, continuously skimming off the froth or scum containing the yeast at the top of the liquid, continuously separating the yeast cells from the liquid portions containing the non-spent sugar, continuously returning the latter to the main body portion of the sugared liquid and in continuously aerating the yeast during the skimming and during the separation of the yeast from the liquid portion.

5. The herein described process of making yeast, which consists in propagating pure yeast in a pure sugared liquid in the presence of nutritive salts and air, continuously skimming off the scum or froth containing the yeast cells at the top of the liquid, continuously separating the yeast cells from the liquid, aerating the liquid during the entire period of propagation, and returning the separated liquid portion to the main body of the yeast making material, whereby the undeveloped values in the liquid thus returned may be propagated and recovered.

6. The herein described process of making yeast, which consists in propagating pure yeast in a pure sugared liquid in the presence of nutritive salts and air, continuously skimming off the scum or froth containing the yeast cells at the top of the liquid, continuously separating the yeast cells from the liquid, aerating the liquid during the entire period of propagation, returning the separated liquid portion to the main body of the yeast making material, whereby the undeveloped values in the liquid thus returned may be propagated and recovered, and in subsequently subjecting all of the liquid which forms the main body of the yeast-propagating material to centrifugal action whereby the yeast in the liquid is recovered.

7. The herein described process of making yeast, which consists in propagating pure yeast in a pure sugared liquid of a given density in the presence of nutritive salts and air, separating the scum containing the yeast thus propagated from the main body of the liquid, subsequently separating the yeast cells from the associated liquid of the scum, adding sufficient sugared solution to the separated liquid to bring the main sugared solution to its original density when the separated liquid is returned to it.

LUCIEN LAVEDAN.